United States Patent [19]
Günttner

[11] 3,940,991
[45] Mar. 2, 1976

[54] BAROMETER GAS PRESSURE MEASURING APPARATUS

[76] Inventor: Rudiger Günttner, Heinrichstrasse 47, 45 Osnabruck, Germany

[22] Filed: Feb. 4, 1974

[21] Appl. No.: 439,069

[30] Foreign Application Priority Data
Feb. 8, 1973   Germany............................ 2306062

[52] U.S. Cl. .......................... 73/393; 73/384; 92/1
[51] Int. Cl.² ...................... G01L 19/02; G01L 7/00
[58] Field of Search ............ 73/385, 386, 384, 393; 92/1

[56] References Cited
UNITED STATES PATENTS

| | | | |
|---|---|---|---|
| 2,472,735 | 6/1949 | Ulrich................................. | 73/385 |
| 2,906,095 | 9/1959 | Whitehead, Jr................... | 73/393 X |
| 2,960,867 | 11/1960 | Valcourt........................... | 73/385 X |
| 3,333,472 | 8/1967 | McLellan........................... | 92/1 X |

FOREIGN PATENTS OR APPLICATIONS

| | | | |
|---|---|---|---|
| 646,251 | 12/1927 | France..................................... | 92/1 |
| 13,074 | 7/1880 | Germany .............................. | 73/385 |
| 1,211,754 | 10/1958 | France ................................. | 73/385 |
| 825,135 | 11/1937 | France ................................. | 73/385 |

*Primary Examiner*—Richard C. Queisser
*Assistant Examiner*—Daniel M. Yasich
*Attorney, Agent, or Firm*—Toren, McGeady and Stanger

[57] ABSTRACT

The invention relates to a gas pressure measuring apparatus having a gas-filled tank whose tank gas pressure acts from one side via an aperture in the tank wall on a movable part, more particularly a drop or column of liquid in a capillary, tube or the like, or a diaphragm closing the tank aperture or an aperture in an adjoining chamber having an indicating device, while the other side of the movable part or diaphragm can be acted upon by the gas to be measured with the lines of the gas tank provided with members having different rates of expansion upon temperature changes to provide compensation therefor.

14 Claims, 6 Drawing Figures

U.S. Patent   March 2, 1976   Sheet 2 of 2   3,940,991
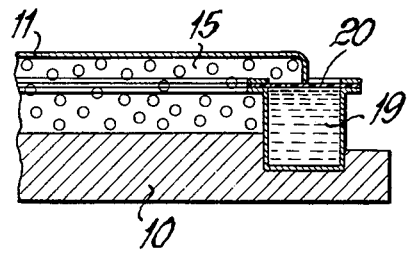
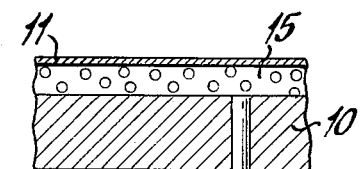
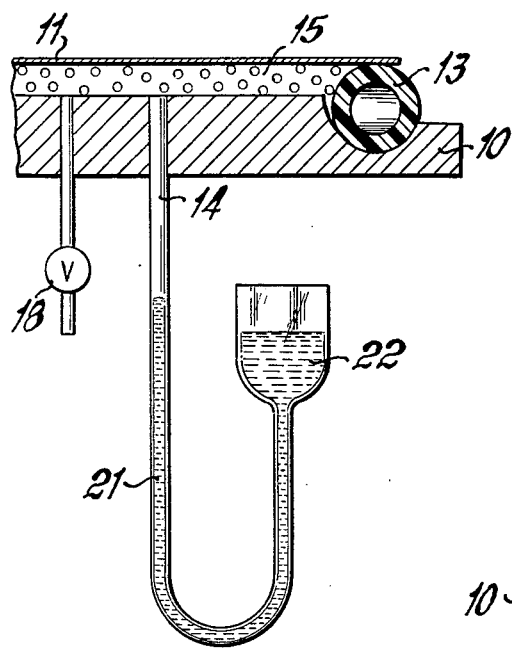
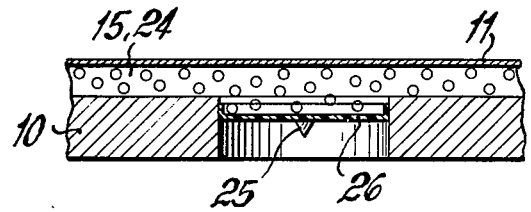

BAROMETER GAS PRESSURE MEASURING APPARATUS

BACKGROUND OF THE INVENTION

More particularly the invention relates to air barometers and variometers.

Due to the change in volume of the gas enclosed in the tank in dependence on temperature, the indication of gas pressure measuring apparatuses of the kind to which the invention relates is heavily dependent on temperature (about 2.6 mm mercury column per °C change in temperature, if the pressure of the enclosed gas is 760 mm Hg at 20°C). For this reason the field of application of gas pressure measuring apparatuses of this kind has hitherto been extremely limited, although they are cheap instruments of simple construction and high indicating sensitivity (it is easy to provide for an air barometer a scale division of 10 mm per mm of mercury for change in air pressure with only 10 cm$^3$ enclosed gas volume).

Suggestions and attempts are known for automatically compensating the temperature dependence of the indication of gas pressure measuring apparatuses. They are based on the idea of compensating the differences in pressure, caused by changes in temperature, of the gas enclosed in the tank by the temperature-dependent level of a column of liquid which is either disposed as a pressure indicating element inside a capillary or tube system connected to the inside of the tank, or is layered above or below an indicating column of that kind and connected directly or indirectly via other columns of liquid to the gas in the tank. The level of the column of compensating liquid, in dependence on temperature, is made such, having regard to the coefficient of thermal expansion of the particular liquid, that the forces tending to produce displacement and caused only by a change in temperature cancel one another out.

The compensating devices on air barometers constructed on this principle take up a lot of space, are complicated and unstable in tilting, and more particularly the correct compensation depends on the correct position of the instrument and the compensating range is limited by the length of the columns of the liquid required for compensation. Moreover, this principle of compensation cannot be applied to variometers.

SUMMARY OF THE INVENTION

It is an object of the invention to provide a device which does not take up much space, is technically uncomplicated and stable in changes in position, for gas-pressure measuring apparatus of the kind specified, by means of which the influence of temperature on the pressure indication can be so far compensated as to be negligible in practical use, thereby opening up a wide field of application for air barometers, variometers and similar gas pressure measuring apparatuses, whether they are constructed in the form of indicating instruments or use a liquid thread as the indicating elements.

According to the invention, in a gas-pressure measuring apparatus of the kind specified the wall of the gas tank is at least partially made of a material with a higher coefficient of thermal expansion, due to whose change in volume per unit of temperature the capacity of the tank alters in the same direction and to the same extent as the volume of the gas enclosed in the tank, so that the pressure of the gas remains constant.

In one embodiment of the gas pressure measuring apparatus according to the invention the gas tank comprises an inner member, having a lower coefficient of thermal expansion, acting as the gas-displacing element, and an outer element which encloses the inner element at preferably a small distance and has a high coefficient of thermal expansion, the gap between the inner and outer elements taking the form of a gas-absorbing chamber closed gas-tight by a preferably resilient seal. The inner member can take the form of a tube or rod and the outer member can comprise a tube, hose or beaker enclosing the inner member at a distance, and the seal can be a resilient circular ring disposed between the outer wall of the inner member and the inner wall of the outer member and can be formed with apertures for a gas shut-off cock and a connecting line extending to the pressure indicator.

In a variant embodiment the gas tank comprises a bottom and cover plate with a low coefficient of thermal expansion and a side wall which has a high coefficient of thermal expansion and interconnects such walls, determining their distance from one another. That side wall can also comprise a self-contained hose.

BRIEF DESCRIPTION OF THE DRAWINGS

Further features and advantages of the invention can be gathered from the following description of various embodiments applied to an air barometer according to the invention, with reference to the drawings. These embodiments are merely examples of embodiments of the idea of the invention, which is not limited thereto. Many variants of these embodiments can be adopted without exceeding the scope of the invention.

FIG. 3 is a diagrammatic detail of a further variant, and

FIGS. 4–6 illustrate diagrammatically various embodiments of gas pressure measuring apparatuses acting as indicators.

DETAILED DESCRIPTION OF THE INVENTION

Figure 1:
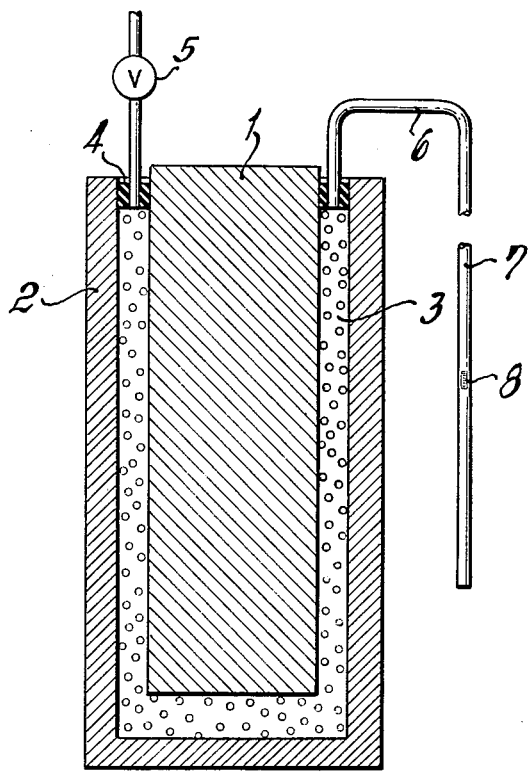
FIG. 1 shows diagrammatically by way of example an embodiment of a temperature-compensated aneroid barometer according to the invention.

FIG. 1 illustrates an embodiment of the invention of very simple construction. In the barometer illustrated a tube or rod 1 of low coefficient of thermal expansion is disposed as a gas-displacing inner member in a beaker-like outer member 2 made of a material having a high coefficient of thermal expansion. The gap 3 between inner member 1 and outer member 2 acts as a gas-filled tank and is sealed by an annular resilient seal 4 having apertures for an inlet cock 5 and a connecting line 6 extending to an indicator comprising a capillary 7 with liquid drop 8.

When changes in temperature take place, the capacity of the outer member 2 changes to a greater extent than that of the inner member 1, resulting in a change in volume ΔV of the gap 3 which is proportional to the change in temperature. Suitable dimensions of the inner and outer members 1, 2 ensure that the particular change in volume ΔV of the gap 3 corresponds to the change in volume of the quantity of gas in the gap 3, at which its pressure remains constant.

The conditions under which this compensation takes place can be determined by calculation in accordance with the known laws of physics.

The essential aspect of the embodiment illustrated in FIG. 1 is that the inner member 1 "displaces" the majority of the volume of the inner space of the outer member 2, so that only a relatively small volume is to be subjected to temperature compensation. This "displacement" can also be performed at other substances, for instance completely or partially by liquids having as low a coefficient of expansion as possible and a low vapour pressure, or by solid pulverulent substances with low coefficient of expansion or by combination of such substances.

To reduce the length of the apparatus, a number of tubes can be connected in parallel.

Figure 2:
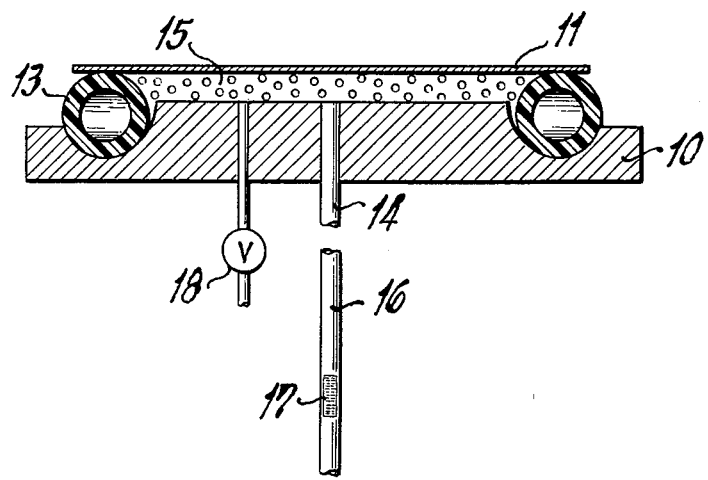
FIG. 2 illustrates a variant embodiment of the barometer.

In the other embodiment of a barometer according to the invention, as illustrated in FIG. 2, the gas tank mainly comprises a baseplate 10, a coverplate 11 and a self-contained hose 13 which interconnects the plates 10, 11 and is made of a material (e.g. PVC or polythene, with a linear coefficient of expansion of $200.10^{-6}$) having as high a coefficient of thermal expansion as possible, whereas the coefficient of thermal expansion of the baseplate 10 is as low as possible. A connecting line 14 connects the inner space 15 of the tank through an aperture formed in plate 10 to a pressure indicator which can comprise a capillary 16 which is closed by a liquid drop 17 and whose open end can be connected directly to the gas pressure to be determined, the capillary 16 and drop 17 together forming a movable indicating means. A shut-off cock 18 admits gas to the tank or discharges it therefrom.

If the temperature changes, due to the high coefficient of thermal expansion of the hose 13, the coverplate 11 rises or falls, increasing its distance from the baseplate 10. As a result the volume of the inner space 15 of the tank alters correspondingly, due to the dimensions of the members 10, 11, 13 and the respective coefficients of thermal expansion, to an extent such that this change in volume corresponds to the change of volume of the gas enclosed in the inner space 15 for the particular change in temperature, the pressure being maintained constant, so that the gas pressure inside the tank remains unaffected by the temperature. The dimensions to be used for this purpose can be determined experimentally without the need for detailed calculations.

To enable the gas volume to be kept as high as possible for optimum sensitivity of indication, the hose 13 can be filled with a liquid having as high a temperature dependent coefficient of expansion as possible. The hose 13 can also be connected to at least one rigid vessel which has a low coefficient of thermal expansion, which is completely filled with the liquid and closed on all sides. Conveniently, the liquid vessels are disposed as closely connected in space as possible to the inner space 15 of the container — i.e., on the bottom or coverplate — to make the temperature compensation as uniform as possible.

FIG. 3 illustrates a variant of the embodiment illustrated in FIG. 2, in which the hose 13 is replaced by a rigid vessel 19 filled with a liquid and closed by a resilient diaphragm 20. Due to the change in volume of the liquid in dependence on temperature, the distance between the coverplate 11 and baseplate changes, the consequent change in volume of the inner space 15 of the tank being such that the pressure of the gas in the inner space 15 remains substantially constant.

The indicator used need not be a capillary with a liquid drop, but, for instance, the device illustrated in FIG. 4, comprising a capillary 21 bent in U-shape which is connected, for instance, to the connecting line 14 of the device illustrated in FIG. 2 and has an open liquid tank 22 at its end and in which a column of liquid acts as an indicating element thus forming another type of movable indicating means. No matter how large the volumes of gas may be, the sensitivity of indication is limited by the specific weight of the indicating column. A conventional method of preventing this is to overlayer the column of liquid in the right-hand part of the capillary with a second liquid which is not miscible therewith and has almost identical specific weight.

A simpler method is illustrated in FIG. 5. In this case the movable indicator means comprises a substantially spirally bent capillary 23 with branches 23a–23c extending in a straight line. The branches 23a and 23c have the same cross-section, whereas the cross-section of the branch 23b is unimportant to operation. The capillary 23 is filled with liquid both surfaces of which always move in the same direction and by the same amount in the branches 23a and 23c, so that only the differential pressure of the column of level $h_1$, $h_2$ is left, this corresponding to the effect of a drop having a length $h_1-h_2$. If we take $h_1=h_2$, the liquid in the capillary 23 exerts no pressure whatever on the gas enclosed in the inner space 15 of the tank. Moreover, the indication is only slightly influenced by rotations or oscillations of the instrument, and all the less in proportion as there is a smaller distance between the liquid surfaces.

Pressure fluctuations due to temperature-dependent expansion of the liquid in the capillary 23 can be compensated by increasing the quotient $\Delta V/\Delta T$. Otherwise, a device of suitable size as illustrated in FIGS. 1, 2 or 3 can be connected to the capillary branch 23b by a connection corresponding to the line 14 (FIG. 2) and with the device completely filled with liquid. For compensation and to reduce the influence of temperature, the capillaries can also be made from a material with a high coefficient of expansion.

The capillary branches 23a and 23c can also be filled with different liquids which are immiscible with one another and whose boundary layer lies in the branch 23b with suitable dimensioning of the capillary branches. To prevent the liquid from running out of the capillary 23a, the latter branch can be filled with a liquid which does not wet the capillary wall.

Just like that of a capillary with a liquid drop, the sensitivity of indication of a device such as that illustrated in FIG. 5 also amounts to $V/q.1/p$ mm scale graduations per mm Hg change in pressure, where V is the enclosed gas volume in mm$^3$, q is the cross sectional surface of the indicating capillary mm$^2$, and p is the pressure of the enclosed gas in mm Hg. Since even with constant temperature the quotient $V/p$ is not constant (with an increase in air pressure p increases and V is reduced), the indicating scale is only approximately linear. It can be varied, more particularly made linear, by varying the cross-section q of the indicating capillary with the level, in which case with the arrangement illustrated in FIG. 5, the cross-section of the capillary branch 23a must also be varied in the same manner.

Just like other embodiments of the invention, the barometer construction illustrated in FIGS. 1–3 can also take the form of indicating instruments. To this end, for instance, the barometer illustrated in FIG. 2 is connected by the line 14 to a chamber 24 (FIG. 6) which is closed by a resilient diaphragm 26 and whose movements can be transmitted by a pointer transmission 25 to a pointer. The diaphragm 26 can however also be disposed directly on the bottom plate 10 of the apparatus illustrated in FIGS. 2 or 3, as also shown in FIG. 6.

In the barometers according to the invention a correction of level can be performed in known manner by altering the enclosed amount of gas, applying the barometric level formula.

A very simple embodiment of a temperature-compensated variometer can be obtained, for instance, by substituting a flow resistance (very narrow capillary) for the cock 18 in the embodiment illustrated in FIG. 4. As a rule a variometer can be temperature-compensated by temperature-compensating the enclosed volume of air, on the principle described in relation to FIGS. 1–3.

I claim:

1. A gas pressure measuring apparatus comprising a tank filled with a pre-set quantity of a gaseous sensory medium, the volume of which is utilized for the measurement of a gas pressure, said tank having at least one aperture formed in a wall thereof, movable indicating means having a first end portion and a second end portion, said first end portion being received by said aperture so that said movable indicating means cooperates with said gaseous sensory medium, and said second end portion open to and cooperating with the ambient gas outside of said tank, the pressure of which is to be measured, and said tank comprises a first portion having a low coefficient of thermal expansion, and a second portion having a high coefficient of thermal expansion, said first and second portions each forming at least a portion of one of the walls of said tank, whereby the volume of said tank filled with said pre-set quantity of gaseous sensory medium can be varied in correspondence to any change of ambient temperature of said sensory gaseous medium so as to keep the pressure thereof constant.

2. A gas measuring apparatus according to claim 1, wherein said movable indicating means comprises tube means having said first end portion connected to said aperture and having means for indicating pressure therein.

3. A gas pressure measuring apparatus according to claim 2, wherein said means for indicating comprises a liquid drop.

4. A gas pressure measuring apparatus according to claim 2, wherein said means for indicating comprises a liquid confined in said tube means.

5. A gas pressure measuring apparatus according to claim 2, wherein said tube means comprises a spiral-shaped tube having three straight, parallel branches.

6. A gas pressure measuring apparatus according to claim 1, wherein said first portion of said tank comprises at least one inner member acting as a gas-displacing element, and said second portion of said tank comprises an outer member surrounding said inner member.

7. A gas pressure measuring apparatus according to claim 6, wherein said gas tank further comprises a resilient seal, said aperture being formed in said seal, and said seal closes off said gas-filled tank.

8. A gas pressure measuring apparatus according to claim 6, wherein said outer member comprises a beaker-like member.

9. A gas pressure measuring apparatus according to claim 1, wherein said second portion of said tank comprises a hose forming the sides of said tank.

10. A gas pressure measuring apparatus according to claim 9, wherein said hose has a liquid filled therein having a high coefficient of thermal expansion.

11. A gas measuring apparatus according to claim 9, wherein said first portion of said tank comprises a cover plate, a base plate, and said hose connects said cover plate with said base plate.

12. A gas pressure measuring apparatus according to claim 11, wherein said aperture is formed in said base plate.

13. A gas measuring apparatus according to claim 1, wherein said second portion of said tank comprises a rigid vessel forming the side walls of said tank, a liquid enclosed by said vessel, and a diaphragm closing the liquid in said vessel and connected to a top part of said gas tank so that with change in temperature the liquid moves said diaphragm and, therefore, changes the volume of said tank.

14. A gas measuring apparatus according to claim 13, wherein said first portion of said tank comprises a top cover plate and a bottom plate, said second portion of said tank connecting said top plate with said bottom plate.

* * * * *